United States Patent [19]

Porter et al.

[11] Patent Number: 5,263,032
[45] Date of Patent: Nov. 16, 1993

[54] COMPUTER SYSTEM OPERATION WITH CORRECTED READ DATA FUNCTION

[75] Inventors: Brian Porter, Marlboro, Mass.; Christopher A. Mega, Wilton, N.H.; Russell L. Myers, Grafton, Mass.

[73] Assignee: Digital Equipment Corporation, Maynard, Mass.

[21] Appl. No.: 721,959

[22] Filed: Jun. 27, 1991

[51] Int. Cl.⁵ .............................................. G06F 11/10
[52] U.S. Cl. ................... 371/40.2; 371/10.2
[58] Field of Search ............. 371/40.2, 40.3, 40.4, 371/5.1, 10.2

[56] References Cited

U.S. PATENT DOCUMENTS 4,920,539  4/1990  Albonesi ........................... 371/40.2
4,964,130 10/1990  Bowden, III et al. ............. 371/40.2

OTHER PUBLICATIONS

Saleh, "Reliability of Scrubbing Recovery-Techniques for Memory Systems", IEEE Trans. on Reliability, Apr. 1990, pp. 114–122.
Bossen et al., "A System Solution to the Memory Soft-error Problem", IBM J. Res. Develop., May 1980, pp. 390–397.
Kunda et al., "Improving Memory Subsystem Availability Using BIST", IEEE Int'l Conf. on Computer-Aided Design, Dig. of Tech. Papers, 1987, pp. 340–343.

*Primary Examiner*—Vincent P. Canney
*Attorney, Agent, or Firm*—Arnold, White & Durkee

[57] ABSTRACT

A computer system having a memory with an ECC function employs an improved method for handling corrected read data events, so transient errors caused by alpha particle hits in DRAMs may be distinguished from hard errors. When a corrected read data event occurs, a footprint defining its location is compared with previously-stored footprints to determine if this location has failed before. Also, a location showing a corrected read data event is "scrubbed" (data is read, corrected and rewritten) so transient error locations are removed. If another corrected read data event occurs for this same location, after scrubbing, then the location is assumed to have a hard fault, and so the page containing this location is replaced.

22 Claims, 5 Drawing Sheets

COMPUTER SYSTEM OPERATION WITH CORRECTED READ DATA FUNCTION

BACKGROUND OF THE INVENTION

This invention relates to computer operation, and more particularly to a method of handling memory errors in computers.

Semiconductor memory devices used in computers are manufactured using cell sizes and cell densities such that the devices are susceptible to alpha particle failure, particularly dynamic RAMs or DRAMs. Packaging for the memory devices inevitably contains radioactive elements which upon decay result in alpha particles which penetrate the silicon die. An alpha particle hit can cause a cell to switch state. To circumvent this type of error, ECC (error checking and correcting) circuits are used in computer memory systems. An ECC circuit adds a check code to each block of data as it is stored, calculated on the basis of the data being stored. When this data is later read, the stored code is checked against the read data, and if there is an erroneous single bit within this data the bit is corrected before the data is sent to the CPU. If more than one bit is bad, however, the data is un-correctable, and an error fault is signalled. Thus, transient single-cell errors prevalent in DRAMs due to alpha particle hits can be tolerated in a computer system, since the occurrence of this type of error is virtually transparent to the executing application.

It has been the practice in operating computer systems to record and report errors occurring during operation. This recording takes the form of an error log. Corrected errors such as facilitated by ECC circuits used in memory and other points in the system do not prevent the system from continuing to function properly, but nevertheless such errors may indicate components likely to fail catastrophically, and thus should be replaced. However, correctable errors caused by alpha particle hits do not provide useful information from this standpoint, since replacement of the memory devices showing alpha hits would not cure or reduce the hits in the future. Alpha hits are estimated to be one hundred times more prevalent than hard errors in correctable read errors occurring in DRAMs. Thus, it is desirable to distinguish correctable read errors caused by alpha particle hits from other types of errors in recording and reporting on the operation of a computer system.

It has previously been the practice to "scrub" memory locations that show correctable errors such as those produced by alpha particle hits in DRAMs. By scrubbing is meant that the memory location is copied onto itself, with any errors being corrected by ECC circuits, so a transient error is eliminated. Memory subsystems are commonly used which the ability to perform the memory scrubbing operation independently, transparent to the CPU. In such case, the memory subsystem contains hardware necessary to detect that an ECC error has occurred, noting the address, and to generate a read and write operation to this location. Alternatively, a scrub operation can be implemented by the CPU as part of its operating system. When implemented by the memory subsystem this is referred to as hardware scrubbing, or if implemented by the CPU via its operating system this is referred to as software scrubbing.

A virtual memory type of operating system such as VMS TM or UNIX TM has the ability to replace a page frame number when a particular page of physical memory produces error faults. When a read is attempted and is unsuccessful due to parity errors or the like, the operating system can copy the page frame to another page frame number in physical memory (another physical location) and put the old page on a "bad memory" list so it will not thereafter be used by the computer.

The previous ways of operating computer systems with regard to memory errors have thus included scrubbing memory locations which exhibit read errors correctable by ECC circuitry, and replacing page frame numbers for memory locations that report non-correctable errors. In both cases the occurrence of errors is logged so that field replacement of faulty components, or those likely to fail, is facilitated.

SUMMARY OF THE INVENTION

In accordance with one embodiment of the invention, a computer system having a memory with an ECC function employs an improved method for handling corrected read data events, so transient errors caused by alpha particle hits in DRAMs may be distinguished from hard errors. When a corrected read data event occurs, a footprint defining its location is generated, and this footprint is compared with previously-stored footprints to determine if this location has failed before; if so, the previous footprint is updated, or if not, the new footprint is stored. Also, a location showing a corrected read data event is "scrubbed" (data is read, corrected and rewritten) so transient error locations are removed; the fact that a location has been scrubbed is recorded in the stored footprint. By using the stored footprint data, it can be determined when another corrected read data event occurs for this same location, after scrubbing; when this occurs, the location is assumed to have a hard fault, and so the page containing this location is replaced. The old page is marked bad and not used, and the page table is updated in the virtual memory management system to reference the new page after page replacement. Certain pages used by the operating system cannot be scrubbed or replaced, so the method includes checking for non-scrubbable or non-replaceable pages before implementing these operations.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENTS

Figure 1:
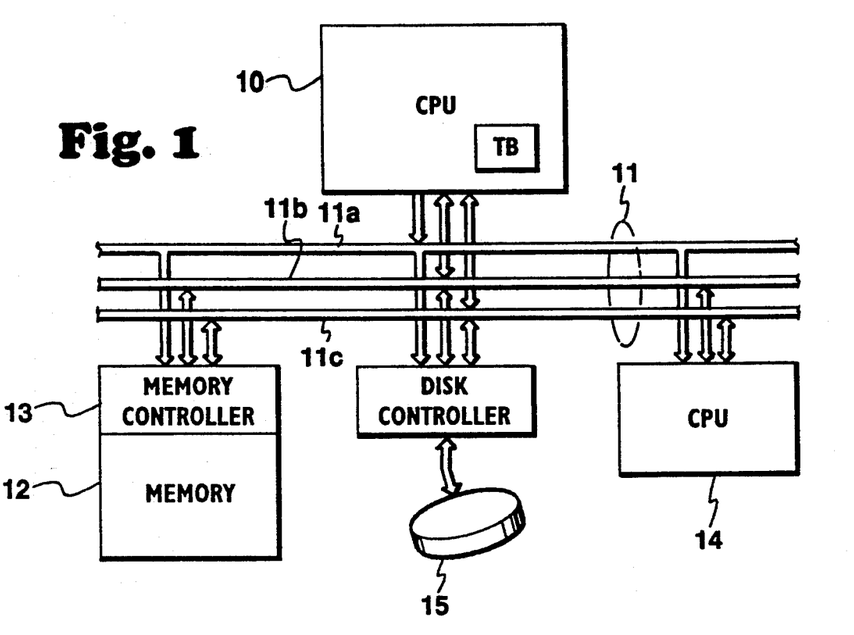
FIG. 1 is an electrical diagram in block form of a computer system which may employ the features of one embodiment of the invention.

Referring to FIG. 1, a computer system which may employ the method of the invention is illustrated. This system includes a CPU 10 connected by a system bus 11 to access a main memory 12 through a memory controller 13. Other CPUs 14 may also access the memory 12 via the bus 11. A disk memory 15 is also accessed by the CPU via the system bus 11 and a disk controller. The system bus 11 includes an address bus 11a, a data bus 11b and a control bus 11c. The CPU 10 may be of the VAX architecture implementing the VMS operating system, as described by Levy and Eckhouse in "Computer Programming and Architecture: The VAX", 2nd Ed., Digital Press, 1989, or in U.S. Pat. No. 5,006,980, issued to Sander, Uhler & Brown, assigned to Digital Equipment Corporation, the assignee of this invention, which are incorporated herein by reference. Alternatively, the CPU 10 may be of an advanced 64-bit RISC type as disclosed in copending application Ser. No. 547,630, filed Jun. 29, 1990, also assigned to Digital Equipment Corporation. In addition, the features of the invention are useful in CPUs of other construction such as the 386 type or MIPS R3000 type, and executing other operating systems such as UNIX. The CPU 10 executes a virtual memory management system in which pages of memory are addressed within the CPU using virtual addresses, while physical memory such as the main memory 12 is addressed using physical addresses.

Figure 2:
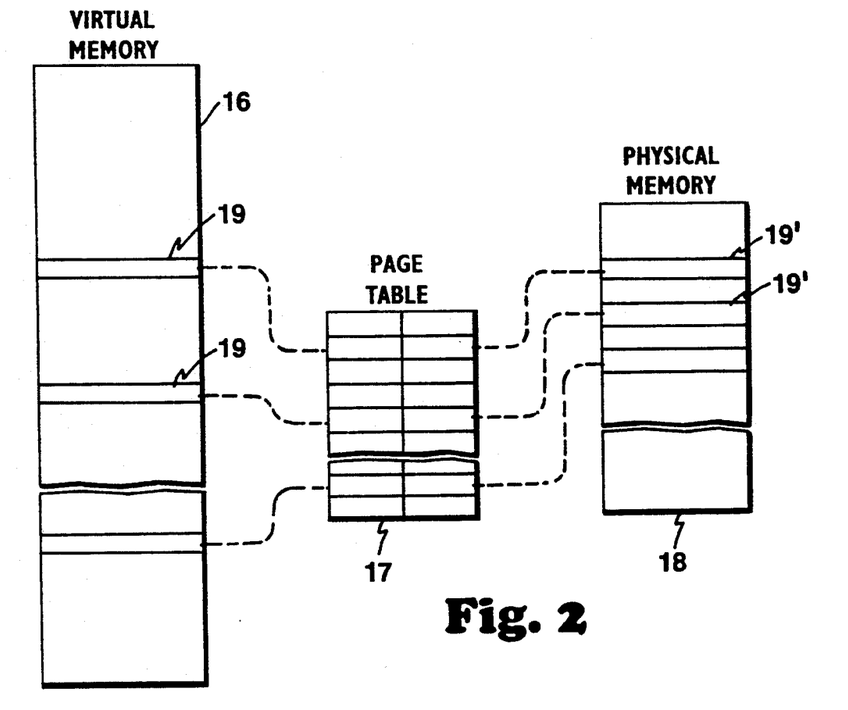
FIG. 2 is a diagram of memory mapping for a virtual memory scheme which may be used in the system of FIG. 1.

The CPU 10 generates memory references by first forming a virtual address, representing the address within the entire address range 16 as seen in FIG. 2, defined by the address width in the architectural specifications of the computer, or that portion of the address width allowed by the operating system. Then using a page table 17 the virtual address is translated to a physical address represented by an address map 18; the physical memory is constrained by the size of the main memory 12. The translation is done by pages (e.g., 512-byte blocks), so a virtual page address for a page 19 in the virtual memory map 16 is translated to a physical address 19' for a page (referred to as a page frame) in the physical memory map 18. The page table 17 is maintained in memory to provide the translation between virtual address and physical address, and usually a translation buffer TB seen in FIG. 1 is included in the CPU to hold the most recently used translations so a reference to the table 17 in memory 12 need not be made in most cases to obtain the translation before a data reference can be made; the time needed to make the reference to a table 17 in memory 12 would far exceed the time needed to obtain the translation from the translation buffer. Only the pages used by tasks currently executing (and the operating system itself) are likely to be in the physical memory 12 at a given time; a translation to an address 19' is in the page table 17 for only those pages actually present in physical memory 12. When the page being referenced by the CPU 10 is found not to be in the physical memory 12, a page fault is executed to initiate a swap operation in which a page from the physical memory 12 is swapped with the desired page maintained in the disk memory 15, this swap being under control of the operating system. Some pages in physical memory 12 used by the operating system kernel, for example, or the page table 17 itself, are in fixed positions and may not be swapped to disk 15 or moved to other page translations; most pages used by executing tasks, however, may be moved freely within the physical memory by merely keeping the page table 17 updated.

Figure 3:
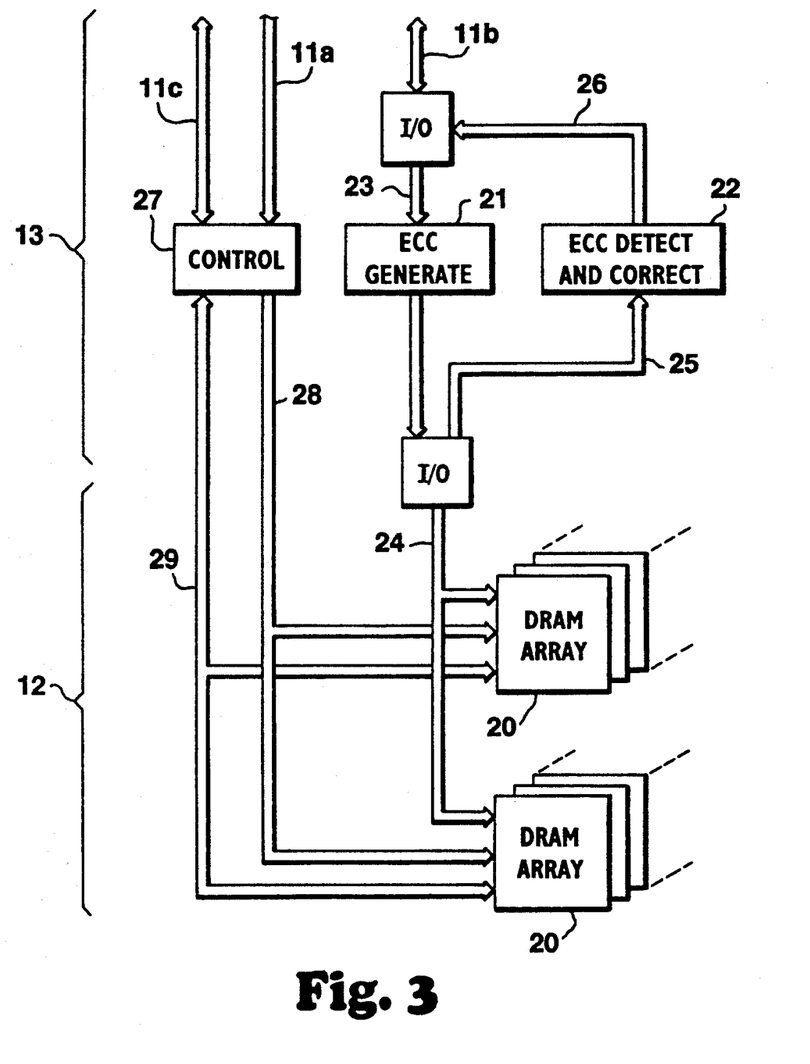
FIG. 3 is an electrical diagram of a DRAM memory bank and ECC circuitry used in the system of FIG. 1, according to the invention.

Referring to FIG. 3, the memory 12 contains a number of banks 20 of DRAMs, in a typical construction. For example, a 64-Mbyte physical memory 12 would contain 128 4-Mbit DRAM devices arranged on PC boards, for data alone, not counting parity, ECC bits, etc.; the particular configuration of the banks of DRAMs in the memory array is dependent upon a specific system design, as is not material here, although the actual physical layout and addressing of the banks of DRAMs will determine the "footprints" as will be described. The data paths for writing to and reading from the banks 20 of DRAMs include an ECC generate circuit 21 and an ECC detecting and correcting circuit 22. Incoming data on bus 23 in the memory controller 13 (from the data bus 11b) is applied to the input of the ECC generate circuit 21, where an ECC code is generated for each segment of data and stored in the DRAMs with the incoming data. For example, if the bus width of data bus 11b is 64-bits, an ECC code may be generated for each 64-bit segment of data presented on the bus 23. Thus, the data width stored in the DRAMs 20 is 64-bits plus the ECC field, which may be 8-bits, for example, so the data path 24 going to and from the DRAMs is 72-bits. In a read operation, the addressed data segment, e.g., a 64-bit segment, is read out from the DRAMs 20 via path 24 and a bus 25 along with the ECC field for this segment, and the circuit 22 functions to compare the ECC field (a number of parity bits) with the actual data retrieved from the addressed location in the DRAMs and to determine if the read data is exactly the same as when it was written. This check function is quite rapid, requiring no noticeable increase in the latency of the memory read operation. If no error is detected, the 64-bit read data is immediately output on bus 26 for return to the CPU 10 via system bus 11b.

The memory controller 13 receives the address and controls from the system bus 11a and 11c at a control circuit 27, and generates multiplexed addresses on lines 28 as well as controls such as RAS, CAS, write-enable, chip select, etc., on control lines 29 going to the DRAMs. The control 27 also generates the refresh operation independent of the CPU. The control 27 can also generate an interrupt to the CPU via control bus 11c, and can collect syndrome information from the ECC correct circuit 22 for sending to the CPU in response to a call.

Alpha hits occur continuously in banks 20, according to some predictable statistical distribution, but are not detected until a read is attempted. A single-bit read error is corrected by the ECC circuit 22, while the calculations required to find the location of the error in the 64-bit wide data segment currently being processed. Nevertheless, even though the data on bus 11b is then good after correction, and is passed on to the CPU 10 in response to the read request, the occurrence of the ECC error correction is reported to the operating system of the CPU 10 by an interrupt generated by the memory controller 13, as will be described. When a bit is disturbed in the DRAMs 20 due to an alpha hit, the bit will remain in the wrong state until it is written over. Thus, a second read to this same location will show another error. For data that resides in main memory for long periods of time, such as parts of the operating system kernel, for example, repeated reads would be likely. A transient error is not distinguishable from a hard correctable error in a single read; the same bad bit will keep appearing and being corrected by the ECC circuit 22 on the way out, for every read operation to this location. For this reason, the memory location is "scrubbed" after a correctable error is detected.

For system maintenance purposes, it is the practice to log all memory errors, as well as errors or malfunctions in other system components, so that components likely to fail can be replaced before a catastrophic system failure occurs. This log merely consists of a record stored in memory or on disk 15 of each error event, giving the component identity, the time, the nature of the error, etc. Most memory errors are transient errors caused by alpha particle hits, however, and so it is a needless complication to log all of the memory errors. It is not necessary to replace a memory board merely because a number of correctable errors were logged, because the memory board may be performing exactly to specification, and the replacement board will likely perform exactly the same way if the same density of alpha hits occurs. It is a needless expense to replace the memory board, and contributes to system downtime while replacement is being implemented.

According to the invention, an attempt is made to distinguish transient errors in memory boards caused by alpha particle hits or the like from other memory errors, so that a memory board showing only correctable errors will not be isolated for replacement, but memory boards showing other types of errors will be identified for replacement. To this end, the following method is used to process correctable errors:

(1) When a correctable error occurs in data read from memory bank 20 via bus 25, the circuit 22 delivers valid (corrected) data onto bus 26 for return to the CPU 10. A correctable error in ECC functions is usually one that has only one bit incorrect in a data segment (64-bits in the example), although some ECC circuits can correct multiple bit errors.

(2) The fact that a correctable read error is reported to the operating system by using a "footprint" data structure as will be described, identifying the memory location, time, etc. These footprints are stored by the operating system so they may be accessed and compared when subsequent errors occur.

(3) The memory location (segment, page, cache line, or other division) where an error occurred is scrubbed, i.e., the data in this location is read (and corrected by the ECC circuit 22 upon reading), then rewritten to the same location. Scrubbing can be done in the memory itself by the memory controller 13, which is referred to as hardware scrubbing, or it can be done by the CPU 10 executing another memory reference by the system bus 11, which is referred to as software scrubbing. If the error was a transient error, this scrubbing will eliminate it from happening again. If the error is a hard error, however, such as a bad cell in a DRAM device, then it will occur again upon the next read to this location.

(4) When another correctable read error event occurs, the error is corrected and data sent back to CPU, and a footprint is generated as before. The footprint is compared to previous footprints and if a match occurs (and this location has already been scrubbed) the location is deemed to be a hard correctable error rather than a transient error, and so the page of memory 12 is replaced. Replacing the page entails assigning a new page frame number in the page table 17 for this page of virtual memory so it will be mapped to a different page (map 18) of physical memory 12. The data in the present page is read (and corrected), then rewritten to the new page frame. The old page frame number is marked "bad" and not used, as the page table is updated. The act of reading the page to copy it back to the new page frame will generate another correctable error, and thus would tend to produce an new footprint, but the new footprint is suppressed by noting that a page replacement is in process.

The basic premise for this corrected read data event processing is that memory errors will have a certain "footprint" where a footprint is defined to be a quadword of hardware-dependent data. The footprint may, but does not necessarily, consist of such information as the memory array card slot number, bank ID, and syndrome bits describing the error (from the ECC circuit 22). The footprint should identify the smallest possible failing memory component, which, depending upon the memory type, may identify the failing DRAM. The exact information stored in the footprint is not critical as far as the method of the invention is concerned; the footprint is simply compared against other footprints on an "equal" or "not-equal" basis.

A corrected read data event with the same ECC syndrome from a particular physical address will repeatedly generate the same footprint. However, it is likely that reads to different physical addresses will generate the same footprint (e.g., reads to different words in a quadword). In addition, the failing physical address reported by a memory controller may not indicate the exact physical location, but instead may identify a region such as a quadword, hexaword, or page, containing the failing address. In other words, there may be an many-to-one mapping between physical addresses and footprints.

The principal data structure used by the corrected read data event processing method described herein is the footprint structure as described below with reference to FIGS. 4 and 5. This structure tracks all required information for each unique footprint. During system initialization, an array of these footprint data structures is allocated from non-paged pool.

When a new, unique corrected read data event occurs, the footprint structure array is scanned looking for the first non-busy footprint structure, and this structure is initialized with the system time and arguments passed by the caller, which contains the quadword footprint identifying this new corrected read data event. Each footprint structure collects information for all corrected read data events which match this footprint over the life of the system, and are sent to the error log under certain conditions: (1) during system shutdown or fatal bugcheck all footprints are logged; (2) when all footprints are in use and a new; unique footprint needs to be created, all footprints are logged and re-initialized; (3) when a corrected read data event causes a footprint to exceed a preset local or system-wide threshold of page replacements, a single footprint is logged and no reinitialization; (4) when an extended domain failure is detected, a single footprint is logged and no reinitialization; and (5) when the system disables corrected read data interrupts from a particular memory controller, a single footprint is logged and no reinitialization. The error log information is used to determine what boards need to be replaced, as in field maintenance.

The actions taken in response to corrected read data events include scrubbing and page replacement, as described. Scrubbing is writing data over itself. Since corrected read data event errors are correctable errors, the system continues to function properly after a corrected read data event occurs, but posts the event to the operating system, as by an interrupt. An assumption is made that a corrected read data event is transient, caused by an alpha particle hit. If the corrected read data event is indeed transient, rewriting the bad location with good data should effectively "scrubb" the location and eradicate the error. Some memory controllers perform hardware scrubbing, others do not. If a location continues to produce corrected read data events after scrubbing, it is assumed to be a hard fault and can later be found via diagnostics or manufacturing test equipment. It is conceivable that a corrected read data event could occur in a heavily-accessed, read-only portion of the system executive, resulting in thousands of corrected read data event reports, but here a simple rewrite of this data could alleviate the problem. In general terms, the corrected read data event method attempts to scrub the location containing the corrected read data event. This simply consists of copying the data back into itself. The size of the scrub region is CPU-dependent, i.e., it may be a page, or a cache block.

There are some regions of memory which cannot automatically be scrubbed, such as pages in nonpaged pool, or pages whose PFN reference count is greater than one. The corrected read data event method determines whether scrubbing is possible before attempting to scrub the location. These restriction are discussed below.

The other main action is page replacement. Page replacement involves the remapping of physical pages of memory in which a hard correctable DRAM fault occurs. The process of replacing these correctable pages will (a) reduce the probability of an uncorrectable error (due to intersecting single-bit errors), extend the life of the memory array (by eliminating the need to replace the memory array by a service call), and (c) limit the overhead of error processing. If a second corrected read data event matches an existing footprint, and the corrected read data event region has already been scrubbed, an attempt is made to replace the page. This is based on the assumption that scrubbing did not solve the problem. Page replacement basically consists of allocating a new page, copying the old data to the new page, updating the PFN database, poisoning the old page with a data pattern, inserting the new PFN into the old PTE, and invalidating the TB. Replaced pages are placed on an internal list of bad pages, effectively removing them from the system. Page replacement is also subject to restrictions regarding the use of the old page. The restrictions are detailed below. The restrictions for page replacement are not identical to those for scrubbing. It is possible to scrub a page but not be able to replace it.

Note that because of the many-to-one physical address to footprint mapping, it is possible that a second matching corrected read data event footprint is not the same physical address that caused the original corrected read data event. If a second corrected read data event generates the same footprint as the first, it is safe to assume both corrected read data events are occurring in the same "locality." The second corrected read data event page may be replaced without having first been scrubbed, if it is determined that the second page is contained within a high/low range of addresses which have already been scrubbed. If this is the case, an entire DRAM may be bad, and all locations in that DRAM would eventually produce corrected read data event errors. If the DRAM is bad, all pages using this DRAM should be replaced anyway. If a particular memory controller data line is bad such that every memory access results in a corrected read data event, page replacement will happen rapidly enough that internal thresholds will be exceeded, an errorlog entry will be generated, and a true hard fault will be detected.

Another issue to consider is synchronization. There are two levels of synchronization required during corrected read data event processing which synchronize access to the footprints themselves, and which synchronize the system when pages are scrubbed or replaced. The first synchronization mechanism is a dynamic lock which controls access to the footprint data structures. Only one corrected read data event will be processed at a time, though corrected read data events may be processed out of order depending on the multiprocessor configuration. The second synchronization requires placing a multiprocessor system into a benign state during scrub and replace operations. The benign state is required for scrubbing and replacing all pages except process pages which are active and owned by the CPU servicing the corrected read data event.

Each footprint structure has an in-use bit which indicates a scrub or replace operation is in progress for this footprint. The act of scrubbing and replacing a corrected read data event location may cause another corrected read data event, since the corrected read data event location is deliberately being accessed. To avoid recording this event, the in-use bit is checked before processing the corrected read data event. If set, this corrected read data event is ignored as it is most likely self-induced. A fork thread runs after the scrub or replace operation has completed which clears the in-use bit, making the footprint structure available. Any corrected read data events which match a footprint structure with its in-use bit set are discarded.

There are certain restrictions for scrubbing and page replacement, i.e., not all pages or locations are candidates for scrub or replacement. In an ideal situation, 100% of the memory locations could be scrubbed and replaced. Unfortunately, in most operating systems, such as a VMS system, for example, this 100% replacement is not possible. The VMS memory layout is broken into defined regions, with each region having its own characteristics. Of particular concern are shared writable pages and pages whose physical addresses are known by other parts of the system. Some shared pages can be scrubbed and replaced with proper synchronization, while others (shared I/O pages, for example) cannot. Whether scrubbing or replacement is allowed depends on how the page is being used by VMS.

There are two types of checks that occur for each page. First are the dynamic checks that occur because of the running environment. These include checking to see that a page is active and valid, has a reference-count of 1, is not mapped by PFN, is not a locked process or global page, and whether benign state synchronization is required before the corrected read data software accesses the page. The other checks are static checks whereby the PTE of the corrected read data page is compared against tables containing begin/end pairs for the permissive system regions. The page must fall within one of the indicated regions for scrub and replacement processing to proceed. A page which is not within a permissive region cannot be touched, but a secondary search against a second set of tables is done to identify the VMS location of the page.

In order to implement one embodiment, four tables are used to define the beginning and ending range of VMS system areas. Two of the tables, a "yes-scrub" table and a "yes-replace" table, define those system areas to which access is allowed. The other two tables, "no-scrub" table and "no-replace" table identify system regions which cannot be accessed, and are used to identify the location of a page which is not found in the yes-scrub and yes-replace tables.

The four tables are allocated from nonpaged pool, and all have the form shown in Table A. Each table consists of four longword "elements." The first longword is a location bitmask indicating the type of region being searched. The location bits are defined in the page-location and failmask fields of footprint structure described with reference to FIG. 5. The next two longwords are begin/end 32-bit virtual address PTE pairs. These pairs mark the beginning and ending PTEs of virtually contiguous system regions described by the system page table. The fourth longword is an optional callback address which can be used to take additional action if a match occurs in a particular region. The tables are terminated with a special "EOF" bitmask.

The four tables are used to determine the particular section of VMS memory in which a corrected read data page resides. The tables demarcate specific regions of system space, and are only searched when a system page incurs a corrected read data. A corrected read data page is a system page if either its PFN is greater than a specified maximum, or the TYPE array for this PFN indicates a system page type.

The regions described by these tables are not meant to be all-inclusive. For a page to be scrubbed or replaced, its PTE must be found within the yes-scrub and yes-replace tables, respectively. If a page is not located in the yes tables, corrected read data processing could end here. However, in the interest of curiosity, statistics gathering, and debugging assistance, the no-scrub and no-replace tables indicate specific failure regions which cannot be scrubbed or replaced. The no tables are searched if a page is not located in the yes tables. A page not found in any table is deemed unknown, and is not scrubbed or replaced.

The contents of the yes tables are selected by a critical review of the candidate regions of VMS memory. The no tables basically consist of regions which were originally considered as yes candidates, but failed for some reason.

These tables are only to determine whether a system page is eligible for scrubbing or replacing. Process and global pages are not subject to the same eligibility requirements.

Table B illustrates the regions described by the tables. "Yes" indicates the region is described by the particular table, "No" means the region is not included in the table.

The regions listed in both yes tables are guaranteed exclusive access by the corrected read data routines with proper synchronization. The regions that can be scrubbed but not replaced did not have this guarantee. Regions such as the SCB are guaranteed to be read only and therefore scrubbable. However, these regions may be doubly mapped by an I/O device which has recorded the physical address of some page in the region. Thus, page replacement is impossible if an I/O device has knowledge of the page's physical location. Regions which are not scrubbable or replaceable are not read only, are shared with I/O devices, are doubly mapped, or are regions which other system software has implicit knowledge and permission to modify at any time.

When a corrected read data event occurs, the first step after an interrupt is received by the CPU is to collect the needed information, including that sent to the CPU by the memory controller 13. To this end, an argument block for a corrected read data event is created of the form seen in FIG. 4. This is shown as a data structure of an example format, but it is understood that the specific format is not material to the features of the invention. Some of this data may be omitted, or some obtained from other sources. The fields include arguments in a return of a procedure call made after the memory controller signals a corrected read error interrupt, for example.

Figure 4:
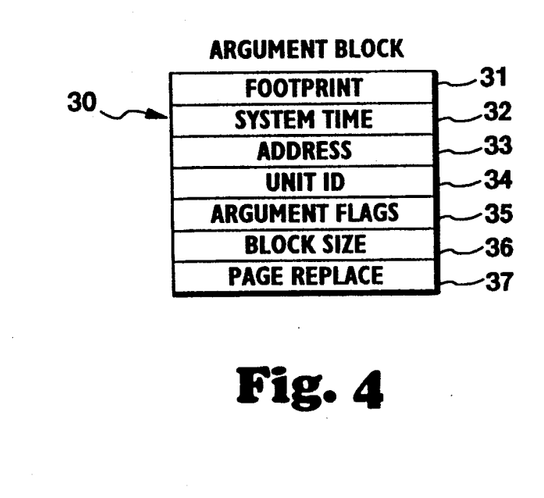
FIG. 4 is a diagram of a data structure for an argument block used in the method of the invention.

The argument block 30 shown in FIG. 4 has a footprint field 31 which contains the footprint for the particular corrected read data event, consisting of a system-specific error syndrome, particularly bit-patterns describing unique information for each error as it occurs, representing the lowest failing component that is identified by the hardware (the ECC circuit 22) for an error event. The format of this field is system-specific, and it is later compared against existing footprints in the corrected read error list to determine if this particular corrected read error has already occurred.

A system time field 32 in FIG. 4 contains the time when the corrected read error event occurred, and an address field 33 contains the physical address of the location of the corrected read error. A unit-ID field 34 contains a system-specific unit-ID for this unit; the unit could be a memory card, an array card, a specific bank of DRAMs within an array, or some other system-specific entity.

An argument flag field 35 supplies the routines with information regarding the system's ability to service read errors, and include three flags: (a) a hardware-scrub flag which, when set, indicates that the block containing the corrected read data event has already been scrubbed by the hardware memory controller, so it is not necessary for the software to scrub this block; (b) a no-scrub flag which, when set, indicates that the routines should create and update footprint information but should not attempt scrubbing this block; and (c) a no-replace flag which, when set, indicates that the routines should update footprint information but should not attempt replacement of this page.

A block-size field 36 contains the size, in bytes, of the block of memory that will be rewritten during a scrub operation. On some systems this will be the size of each block protected by ECC, while on other systems this will be the cache allocate block size.

A page-replace field 37 of FIG. 4 contains the maximum number of pages which can be replaced for this memory unit; this will limit the number of pages that will be replaced for a given memory unit if corrected read data events with the same footprint cause repeated page replacement.

Figure 5:
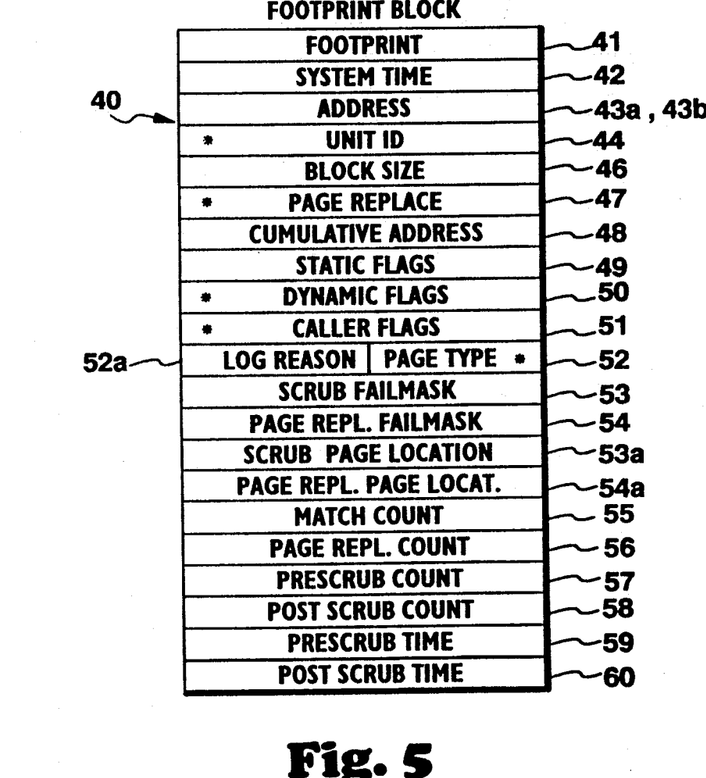
FIG. 5 is a diagram of a data structure for a footprint block used in the method of the invention.

Referring to FIG. 5, a diagram of a data structure for the footprint block 40 stored for each location of corrected read data events is illustrated, according to an example embodiment of the invention. The footprint block contains information describing each unique footprint caused by a corrected read data event, some of this data being supplied by the argument block 30, and other information derived from the specific instance of the corrected read data event being processed. The footprint structure contains dynamic and static information; most information in the footprint block is dynamic and is only current until the next corrected read data event occurs. For example, one corrected read data event could fill the footprint block with certain information, then if another corrected read data event occurs and matches this footprint, the dynamic fields of the footprint block will reflect the information concerning the new corrected read data event. Error log information will capture the dynamic state of the most recent corrected read data event which matched each footprint. Fields marked with an asterisk in FIG. 5 are dynamic. The static fields record collective information for all corrected read data events which matched this footprint. This data structure, block 40 of FIG. 5, has a number of defined fields in the illustration, although it is understood that some of these fields are not needed in some embodiments, and others may be added, as required for the specific purposes of a particular system. Also, the data structure or format is not so rigid as depicted, and usually would be an abstract data type, where fields may be omitted and the lengths may vary, etc. The following paragraphs describe the various fields of the footprint block.

The footprint field 41 in the footprint data structure of FIG. 5 is the same as the footprint field 31 of FIG. 4. The system time field 42 contains the time when the footprint block 40 is created. The address fields 43a and 43b contain physical addresses associated with this footprint. The address-low field 43a contains the lowest physical address associated with this footprint, and is updated when a new corrected read data event occurs at a physical address which is lower than that currently saved in the footprint structure. The address-high field 43b contains the highest physical address associated with this footprint, and is updated when a new corrected read data event occurs at a physical address which is higher than that currently saved in the footprint structure. The address fields 43a and 43b are used for possible isolation of row and column failures within a given DRAM, i.e., an error other than a single-cell error. A unit-ID field 44 contains a system-specific unit-ID for this unit, copied from field 34. Also, block-size field 46 and page-replace field 47 are copied from these fields 36 and 37 of the argument block 30.

An address-cumulative field 43c contains a cumulative bitmask of failing physical address bits for addresses matching this footprint; it is calculated by exclusive-Oring the current failing physical address with the first failing physical address when the footprint was created (the first failing physical address is stored in local cells and is not contained within the footprint structure)-this result is then Ored with the existing address-cumulative mask 43c. The maximum (worst case) number of failing addresses can be determined by $2^x$, where x is the number of bits set in address-cumulative field 43c. Certain bit patterns may identify row or column failures.

A static-flags field 49 contains five flags to maintain current state information for this footprint block 40. A busy flag is set when this footprint is in use. A hardware-scrubbed flag indicates that the block of memory containing the corrected read data event has been already been scrubbed by hardware. A software-scrubbed flag indicates that the block of memory containing the corrected read data event has been already been scrubbed by software; a subsequent corrected read data event matching this footprint makes the page containing this event a candidate for page replacement. A page-replaced flag indicates that the physical page has been replaced by software; a new physical page was allocated and mapped, and the contents of the bad page were copied to the new page. A page-replaced, no-PFN field flag indicates that a page replacement has occurred for a corrected read data page which was not described by the PFN database.

A dynamic-flags field 50 contains a flag to maintain current state information for this footprint block 40 while the footprint block is currently being processed. An in-use flag is set when a scrub or page replacement is currently in progress; this acts as an interlock so a concurrent corrected read data event matching this footprint cannot be processed until this bit is cleared.

A caller-flags field 51 contains three flags copied from the flags field 35 of argument block 30. These three flags are hardware-scrub, no-scrub and no-replace. Hardware-scrub has the meaning as explained above. No-scrub and no-replace indicate that the footprint should be updated but no scrub or page replacement should be attempted.

A page-type field 52 is a seven-bit bitmask indicating the type of page of the corrected read data event matching this footprint. Bits, when set, indicate a process page, a system page, a global read-write page, a global read-only page, a process page-table page, a global page-table page, or a system page whose PFN is larger than a maximum-PFN value.

A log-reason field 52a is a mask indicating the reasons why the footprint was sent to the error log. When a "significant" event (or multiple events) occurs during corrected read data processing, a bit corresponding to the event is set in this mask. The software will detect this bit and immediately log this footprint in the error log. The bits are: (a) unit-threshold, which indicates the current page replacement, if attempted, would exceed the maximum number allowed for a particular memory unit; (b) sys-threshold, which indicates the current page replacement, if attempted, would exceed the maximum number allowed in the overall system; (c) domain-grew, which indicates the address-cumulative field went nonzero as a result of the current corrected read data event; and (d) memory-controller-disable, which indicates that the system code decided to disable corrected read data reporting from a particular memory controller.

A scrub-failmask 53 is a static mask containing the collective reasons why pages cannot be scrubbed. This mask contains fifteen fields: (1) a PFN-too-big field indicates that the PFN derived from a corrected read data physical address was greater than that allowed on the system; (2) a bad-ref-count field indicates that the reference count for this page was not equal to one; (3) a not-active field indicates that this page was not active in the working set; (4) a no-sync field indicates synchronization was required, but all CPUs would not respond to the synch request; (5) a not-valid field indicates the PTE for the page to be scrubbed is not valid; (6) a window-PTE field indicates the page was mapped by PFN because the window bit set in the PTE; (7) a PFN-lock field indicates the page was locked in memory since a lock bit was set in the Working Set List Entry for this page; (8) a boot-driver field indicates the page was part of the boot driver; (9) a nonpaged field indicates that the page resides in non-paged pool; (10) a system-PCB indicates that the page was part of either the NULL PCB, SYSTEM PCB, or the SWAPPER PCB; (11) a page-type field indicates the page was a page type that could not be replaced; (12) a not-pwr-2 field indicates that scrub blocksize was not an integral power of 2; (13) a machine-check field indicates a machine check occurred during the scrub of a bad page; (14) an unknown field indicates the page could not be scrubbed, but its use in the system could not be identified; and (15) an end-of-file bit is used to terminate the NOSCRUB table.

A page-replace failmask 54 is a static mask which contains the collective reasons why pages cannot be replaced. This mask contains twenty-two fields: (1) a PFN-too-big field indicates that the PFN derived from a corrected read data physical address was greater than that allowed on the system; (2) a bad-ref-count field indicates that the reference count for this page was not equal to one; (3) a not-active field indicates that this page was not active in the working set; (4) a PFN-lock field indicates the page was locked in memory since a lock bit was set in the Working Set List Entry for this page; (5) a boot-driver field indicates the page was part of the boot driver; (6) a nonpaged field indicates that the page resides in non-paged pool; (7) a system-PCB indicates that the page was part of either the NULL PCB, SYSTEM PCB, or the SWAPPER PCB; (8) a system-page-table field indicates that the page was part of the System Page Table; (9) a sys-control-block field indicates that the page was part of the System Control Block; (10) a SO-vector field indicates the page was part of the SO vector table; (11) an RPB field indicates that the page was part of the Restart Parameter Block; (12) a page-type field indicates the page was a page type that could not be replaced; (13) a no-sync field indicates synchronization was required, but all CPUs would not respond to the synch request; (14) a not-valid field indicates the PTE for the page to be scrubbed is not valid; (15) a PFN-alloc-fail field indicates that a PFN could not be allocated for page replacement; (16) a unit-thresh field indicates that a page replacement would exceed the limit set for this particular memory unit; (17) a system-thresh field indicates that a page replacement would exceed the limit set for the system; (18) an incon-state field indicates the corrected read data code has an inconsistent view of the system; (19) a window-PTE field indicates the page was mapped by PFN because the WINDOW bit set in the PTE; (20) a machine-check field indicates a machine check occurred during the replace of a bad page; (21) an unknown field indicates the page could not be replaced, but its use in the system could not be identified; and (22) an end-of-file bit is used to terminate the NOREPLACE table.

A scrub-page-location field 53a and a page-replace-page-location field 54a, indicate the type of page in a successful scrub or a successful page replacement operation. There are ten fields in these two fields: (1) a process field indicates the page was a process page; (2) a system-page-table field indicates the page was part of the system page table; (3) an SCB field indicates the page was part of the system control block; (4) an SO field indicates the page was part of the SO vector table; (5) an RPB field indicates the page was (part of) the RPB; (6) a transfer-vector field indicates the page was part of the system transfer vector area; (7) a PFN-database field indicates the page was part of the PFN database; (8) a paged-pool field indicates the page was part of paged pool; (9) a sys-header field indicates the page was part of the system header; and (10) a loadable-image field indicates the page was part of a read-only section of a loadable image.

Four count fields are included in the footprint block 50 of FIG. 5, and these are incremented when the indicated event occurs. A match-count field 55 in the footprint block is used to count the total number of corrected read data events matching this footprint. A page-count field 56 is used to count the number of times pages were replaced using this footprint; a bad page could be replaced with another bad page having the same footprint, or a column or row failure of a DRAM may also produce identical footprints for different pages. A pre-scrub-count field 57 counts the number of corrected read data events which match this footprint before any software or hardware scrubbing occurs (these flags clear in fields 49 and 50); this field represents the number of corrected read data event occurring before page replacement is attempted—a value greater than one indicates software scrubbing was attempted but failed due to the reasons listed in the scrub-failmask 53. A post-scrub-count field 58 counts the number of corrected read data events which match this footprint after software or hardware scrubbing occurred (these flags set in fields 49 and 50); this field represents the number of times page replacement was attempted and failed due to the reasons listed in the page-replace failmask 54.

Two time fields 59 and 60 are copied from the system time field 32 of the argument block 30, upon occurrence of the indicated event, and included in the footprint block 40. One of these is a pre-scrub time field 59 giving the system time at which the most recent corrected read data event matching this footprint occurred, but before any scrubbing occurred from previous corrected read data events matching this footprint (these flags clear in fields 49 and 50). The other is a post-scrub time field 60 giving the system time at which the most recent corrected read data event matching this footprint occurred, but after software scrubbing occurred from previous corrected read data events matching this footprint (these flags set in fields 49 and 50).

Figure 6:
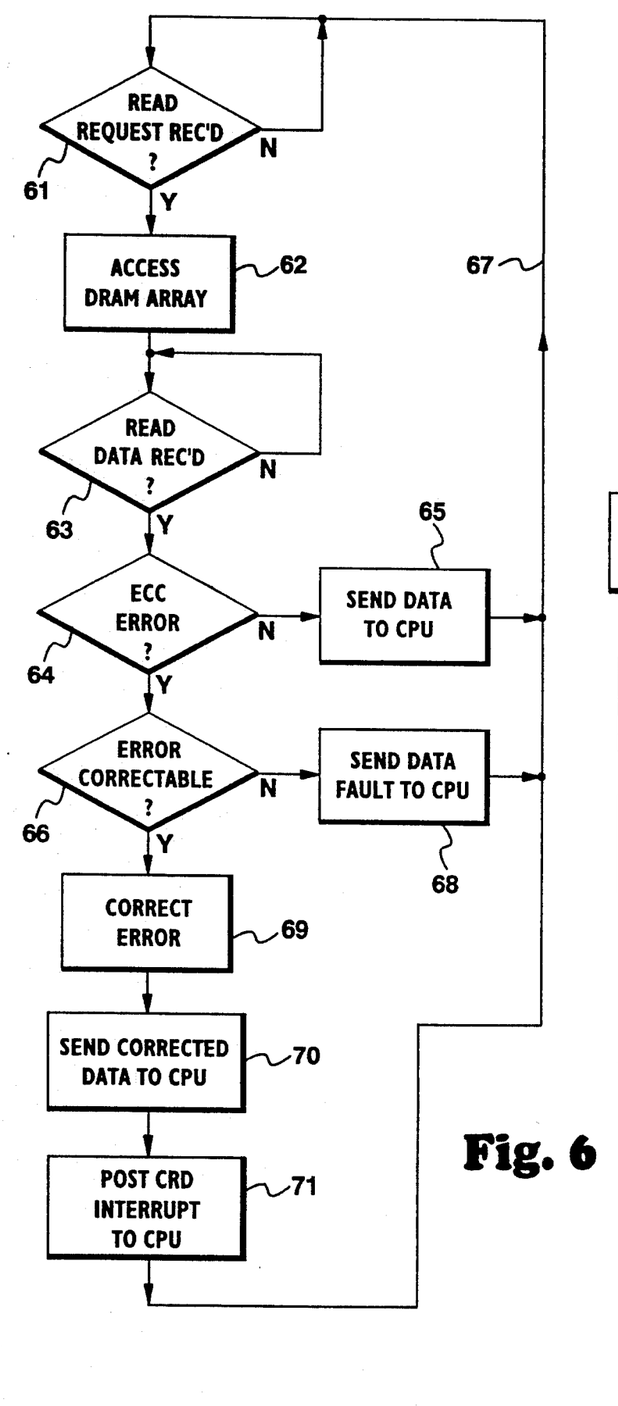
FIG. 6 is a logic flow chart of a sequence of events occurring in the memory controller of FIGS. 1 or 3 according to the invention.
Figure 7:
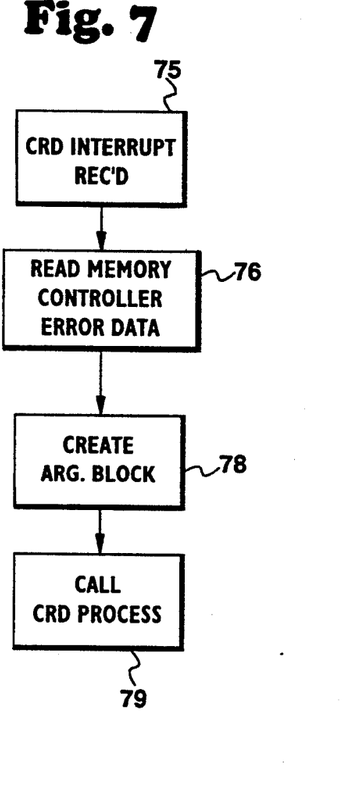
FIG. 7 is a logic flow chart of a sequence of events occurring in the program executed by the CPU 10 of FIG. 1 according to one embodiment of the invention.
Figure 8:
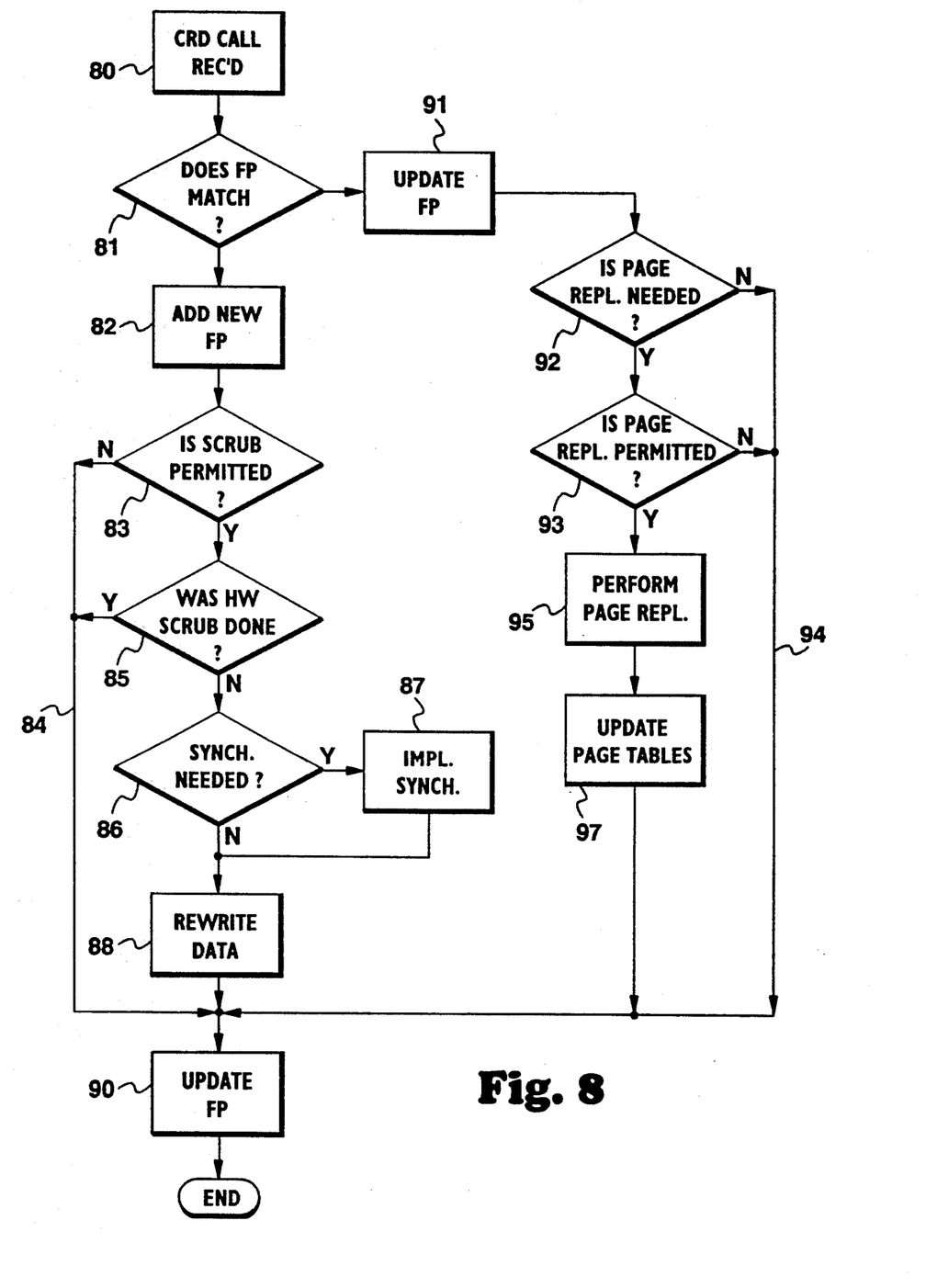
FIG. 8 is a logic flow chart of a sequence of events occurring in the corrected read data event processing executed by the CPU 10 of FIG. 1 according to one embodiment of the invention.

Referring to FIGS. 6, 7 and 8, the events described above in the processing of corrected read data events are shown in logic flow chart format. In FIG. 6, the operation of the memory controller 13 as far as a read data event is depicted, it being assumed that other operations such as write data are not material here. A loop including a decision point 61 detects a memory read request from the CPU 10, by an address on bus 11a and appropriate commands on control bus 11c. When a memory read request is received, the DRAM array 20 is accessed using the read address, indicated by the block 62, and the controller waits for receipt of the addressed data, indicated by the loop 63. When the data is received from the DRAMs it is checked by the ECC circuit 22 for errors, indicated by the decision point 64. If the data shows no error, it is sent to the CPU 10 via system bus 11, as indicated by the block 65, and the control returns to the original loop via path 66. If an error is found, it is determined whether it is correctable at decision point 67, and if not then a data fault is signalled to the CPU as indicated by the block 68, and the memory returns to its entry loop via path 66; this data fault may be signalled by an interrupt, for example, and the method used by the operating system executing on the CPU 10 to process a data fault is not material here. When a correctable error is indicated, the ECC circuit 22 corrects the data as indicated by the block 69. The corrected data is sent to the CPU 10 via bus 11 as indicated by block 70, and then a corrected read data event is signalled to the CPU, as by an interrupt, indicated by the block 71. The control then returns to the entry loop by path 66.

Referring to FIG. 7, the operating system executing on the CPU 10, when receiving a corrected read data event interrupt from the memory controller, indicated by the entry block 75, and finding that this interrupt can be processed, reads error data from the memory controller 13 so that the argument data of FIG. 4 can be created, indicated by the block 76. The corrected read data event processing routine is then called as indicated by the block 79.

In FIG. 8, the corrected read data event processing is illustrated in general form, for one embodiment. The process is entered at block 80 when a call is received from the routine of FIG. 7 which created the argument block of FIG. 4 for a corrected read data event. The footprint of the argument block is compared with all of the existing footprints stored in footprint blocks of FIG. 5, as indicated by decision point 81. If there is no match, a new footprint block is created as indicated by the block 82 of the chart. This entails finding a block of FIG. 5 in the array of these blocks that has the busy flag zero; if there are none, footprints are flushed to the error log and made available for reuse. After a new footprint block has been created, the status is examined at point 83 to see if scrubbing is permitted, and this requires that all of the conditions mentioned above be checked. If not permitted, control passes to the exit steps by the path 84. If scrubbing is permitted, the status is checked to see if scrubbing has already been performed by the hardware (the memory controller), as indicated by the decision point 85, and if so the path 84 is taken to the exit steps. If not, then a check of status is made to see if synchronization is required, at point 86, and if so the synchronization steps are implemented at block 87, and in either event the scrub operation is performed as depicted at block 88, after which the footprint block is updated as indicated by the block 90 and the process exits.

If the compare step 81 in FIG. 8 indicates that footprint already exists, this footprint block is updated as indicated by the block 91. The criteria for page replacement are then checked as indicated by the decision point 92, and if page replacement is indicated then the decision point 93 indicates a check to see if page replacement is permitted. A negative at either of these points 92 or 93 passes control via path 94 to the exit steps. If page replacement is needed and permitted, a page replacement operation is performed as depicted at block 95. The page table is updated at block 97 to identify the virtual page with a new page frame number in the physical memory 12. The old page is removed from further use during this session. The footprint block is updated as before at block 90, before exit.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

TABLE A

| Table Layout |
|---|
| bitmask |
| beginning PTE |
| ending PTE |
| callback address |
| ... |
| bitmask |
| beginning PTE |
| ending PTE |
| callback address |
| bitmask <M_EOF> |

TABLE B

System Regions Defined in SCRUB and REPLACE Tables

| System Region | yes-scrub | no-scrub | yes-replace | no-replace |
|---|---|---|---|---|
| Readonly Section of Loaded Images | Yes | No | Yes | No |
| Transfer Vector Area | Yes | No | Yes | No |
| PFN Database Pages | Yes | No | Yes | No |
| Paged Pool | Yes | No | Yes | No |
| System Header | Yes | No | Yes | No |
| System Control Block (SCB) | Yes | No | No | Yes |
| System Page Table (SPT) | Yes | No | No | Yes |
| SYS$SO_VECTOR Area | Yes | No | No | Yes |
| Restart Parameter Block (RPB) | Yes | No | No | Yes |
| BTDRIVER Pages | No | Yes | No | Yes |
| Nonpaged Pool | No | Yes | No | Yes |
| System PCB | No | Yes | No | Yes |
| NULL PCB | No | Yes | No | Yes |
| Swapper PCB | No | Yes | No | Yes |

What is claimed is:

1. A method of operating a computer system comprising the steps of:
   a) sending requests by a CPU to a memory to read selected data items stored in said memory with ECC codes;
   b) retrieving said selected data items from said memory and checking each said data item using said ECC code, and, if a correctable error is detected, correcting said data item and signalling to said CPU that a corrected read data event has occurred;
   c) storing by said CPU an identification print for a corrected read data event;
   d) comparing an identification print, before storing, with previously-stored ones of said stored identification prints to see if a match exists.
   e) scrubbing a location in said memory for which a corrected read data event occurred; and
   f) moving a block of said memory to another location in said memory when a corrected read data event occurs having an identification print matching that of a previous identification print.

2. A method according to claim 1 wherein said CPU maintains a virtual memory system and said block is a page.

3. A method according to claim 2 where said step of moving a page includes marking said page where the corrected read data event occurred as a bad page in a stored list.

4. A method according to claim 3 including the step of checking said page before moving to determine if said page is relocatable.

5. A method according to claim 1 wherein said step of scrubbing is performed by said CPU rewriting data to said memory.

6. A method according to claim 1 wherein said step of scrubbing is performed by said memory without command from said CPU.

7. A method according to claim 1 wherein said identification print includes therewith an indication of whether or not said location has been scrubbed.

8. A method according to claim 1 wherein said identification print includes therewith an indication of how many of said corrected read data events have occurred at said location.

9. A method according to claim 1 including the step of updating by said CPU an error log of said identification prints.

10. A computer system comprising:
   a) a CPU and a memory, the CPU having means for sending data items to the memory for storing identified by physical addresses and for sending requests to said memory to read selected ones of said data items;
   b) the memory having ECC means for storing said data items along with an ECC code for each item and retrieving said data items and checking said data items against said ECC code to detect and correct any correctable errors occurring;
   c) said memory having means for sending to said CPU an identification print of said physical address in memory of each said data item for which said correctable error is detected and corrected;
   d) said CPU having means for storing said identification prints and comparing each one of said identification prints representing a correctable error, before storing, with previously-stored ones of said stored identification prints to see if a match exists;
   e) means for scrubbing a location in said memory containing each said physical address for which a correctable error was detected; and
   f) means for moving each page of said memory to another page location in said memory when a correctable error occurs having an identification print matching that of a previous correctable error.

11. A system according to claim 10 wherein said CPU maintains a virtual memory system and said block is a page.

12. A system according to claim 11 where said means for moving a page includes means for marking said page where the correctable error occurred as a bad page in a bad page list.

13. A system according to claim 12 including means for checking said page before moving to determine if said page is relocatable.

14. A system according to claim 10 wherein said scrubbing is performed by said CPU rewriting data to said memory.

15. A system according to claim 10 wherein said scrubbing is performed by said memory without command from said CPU.

16. A system according to claim 10 wherein said identification print includes therewith an indication of whether or not said location has been scrubbed.

17. A system according to claim 10 wherein said identification print includes therewith an indication of how many of said correctable errors have occurred at said location.

18. A system according to claim 10 including means for updating by said CPU an error log of said identification prints.

19. A method of operating a computer system comprising the steps of:
   a) sending data items to memory by a CPU identified by physical addresses;
   b) storing said data items in memory along with an ECC code for each item;
   c) sending requests by said CPU to said memory to read selected ones of said data items;
   d) retrieving said selected ones of said data item from said memory and checking said data items using said ECC code, and correcting each of said data items if a correctable error is detected;
   e) storing by said CPU an identification print of said physical address in memory of each said data item for which said correctable error is detected and corrected;
   f) comparing each one of said identification prints representing a correctable error, before storing, with previously-stored ones of said stored identification prints to see if a match exists;
   e) scrubbing a location in said memory containing each said physical address for which a correctable error was detected; and
   f) moving a block of said memory containing the physical address of a correctable error to another location in said memory when a correctable error occurs having an identification print matching that of a previous correctable error.

20. A method according to claim 19 wherein said CPU maintains a virtual memory system and said block is a page.

21. A method according to claim 20 where said step of moving a page includes marking said page where the corrected read data event occurred as a bad page in a stored table.

22. A method according to claim 21 including the step of checking said page before moving to determine if said page is relocatable.

* * * * *